US011410500B2

(12) United States Patent
Patceg et al.

(10) Patent No.: US 11,410,500 B2
(45) Date of Patent: Aug. 9, 2022

(54) VIRTUALIZED MAGNETIC PLAYER CARD

(71) Applicant: IGT, Las Vegas, NV (US)

(72) Inventors: Miles M. Patceg, Las Vegas, NV (US); Reuven Somberg, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/917,512

(22) Filed: Jun. 30, 2020

(65) Prior Publication Data

US 2020/0402359 A1    Dec. 24, 2020

Related U.S. Application Data

(60) Continuation of application No. 15/487,135, filed on Apr. 13, 2017, now abandoned, which is a continuation of application No. 14/330,241, filed on Jul. 14, 2014, now Pat. No. 9,626,832, which is a division of application No. 13/408,587, filed on Feb. 29, 2012, now Pat. No. 8,876,596.

(51) Int. Cl.
G07F 17/32      (2006.01)
G06Q 20/34     (2012.01)

(52) U.S. Cl.
CPC ....... *G07F 17/3251* (2013.01); *G06Q 20/351* (2013.01); *G06Q 20/354* (2013.01); *G07F 17/3204* (2013.01); *G07F 17/3209* (2013.01); *G07F 17/3211* (2013.01); *G07F 17/3218* (2013.01); *G07F 17/3239* (2013.01); *G07F 17/3244* (2013.01)

(58) Field of Classification Search
None
See application file for complete search history.

(56) References Cited

U.S. PATENT DOCUMENTS

| 3,662,105 A | 5/1972 | Hurst |
| 4,071,689 A | 1/1978 | Talmage |
| 4,072,930 A | 2/1978 | Lucero |
| D247,828 S | 5/1978 | Moore et al. |
| 4,159,054 A | 6/1979 | Yoshida |
| 4,283,709 A | 8/1981 | Lucero |

(Continued)

FOREIGN PATENT DOCUMENTS

| EA | 008726 | 8/2007 |
| EP | 1895483 | 3/2008 |

(Continued)

OTHER PUBLICATIONS

EZ Pay® Card Accounts Advertisement, written by IGT, published in 2013 (1 page).

(Continued)

*Primary Examiner* — Jay Trent Liddle
(74) *Attorney, Agent, or Firm* — Neal, Gerber & Eisenberg LLP

(57) ABSTRACT

A method of implementing a player tracking system in a gaming network includes receiving a virtual player tracking card identifier and a virtual player tracking card password, authenticating the identifier and the password; receiving a virtual player tracking card PIN, identifying a gaming machine that transmitted the virtual player tracking card PIN, and crediting an account associated with the virtual player tracking card PIN based on game play on the gaming machine.

15 Claims, 6 Drawing Sheets

(56) References Cited

U.S. PATENT DOCUMENTS

| | | |
|---|---|---|
| 4,339,709 A | 7/1982 | Brihier |
| 4,339,798 A | 7/1982 | Hedges |
| 4,553,222 A | 11/1985 | Kurland |
| 4,856,787 A | 8/1989 | Itkis |
| 5,038,022 A | 8/1991 | Lucero |
| 5,042,809 A | 8/1991 | Richardson |
| 5,048,831 A | 9/1991 | Sides |
| 5,179,517 A | 1/1993 | Sarbin |
| 5,221,838 A | 6/1993 | Gutman |
| 5,265,874 A | 11/1993 | Dickinson et al. |
| 5,287,269 A | 2/1994 | Dorrough et al. |
| 5,290,033 A | 3/1994 | Bittner et al. |
| 5,371,345 A | 12/1994 | Lestrange |
| D359,765 S | 6/1995 | Izawa |
| 5,429,361 A | 7/1995 | Raven |
| 5,457,306 A | 10/1995 | Lucero |
| 5,470,079 A | 11/1995 | LeStrange et al. |
| 5,483,049 A | 1/1996 | Schulze, Jr. |
| 5,559,312 A | 9/1996 | Lucero |
| 5,618,045 A | 4/1997 | Kagan |
| 5,643,086 A | 7/1997 | Alcorn |
| 5,655,961 A | 8/1997 | Acres |
| 5,676,231 A | 10/1997 | Legras |
| 5,702,304 A | 12/1997 | Acres |
| 5,718,632 A | 2/1998 | Hayashi |
| 5,741,183 A | 4/1998 | Acres |
| 5,759,102 A | 6/1998 | Pease |
| 5,761,647 A | 6/1998 | Boushy |
| 5,768,382 A | 6/1998 | Schneier |
| 5,769,716 A | 6/1998 | Saffari |
| 5,770,533 A | 6/1998 | Franchi |
| 5,779,545 A | 7/1998 | Berg |
| 5,788,573 A | 8/1998 | Baerlocher |
| 5,795,228 A | 8/1998 | Trumbull |
| 5,796,389 A | 8/1998 | Bertram |
| 5,797,085 A | 8/1998 | Beuk |
| 5,809,482 A | 9/1998 | Strisower |
| 5,811,772 A | 9/1998 | Lucero |
| 5,816,918 A | 10/1998 | Kelly |
| 5,818,019 A | 10/1998 | Irwin, Jr. |
| 5,833,536 A | 11/1998 | Davids |
| 5,833,540 A | 11/1998 | Miodunski |
| 5,836,819 A | 11/1998 | Ugawa |
| 5,851,148 A | 12/1998 | Brune |
| 5,871,398 A | 2/1999 | Schneier |
| D406,612 S | 3/1999 | Johnson |
| 5,885,158 A | 3/1999 | Torango |
| 5,919,091 A | 7/1999 | Bell |
| 5,943,624 A | 8/1999 | Fox et al. |
| 5,951,397 A | 9/1999 | Dickinson |
| 5,952,640 A | 9/1999 | Lucero |
| 5,954,583 A | 9/1999 | Green |
| 5,957,776 A | 9/1999 | Hoehne |
| 5,959,277 A | 9/1999 | Lucero |
| 5,967,896 A | 10/1999 | Jorasch |
| 5,971,271 A | 10/1999 | Wynn |
| 5,984,779 A | 11/1999 | Bridgeman |
| 5,999,808 A | 12/1999 | Ladue |
| 6,001,016 A | 12/1999 | Walker |
| 6,003,013 A | 12/1999 | Boushy |
| 6,003,651 A | 12/1999 | Waller |
| 6,010,404 A | 1/2000 | Walker |
| 6,012,832 A | 1/2000 | Saunders |
| 6,012,983 A | 1/2000 | Walker |
| 6,019,283 A | 2/2000 | Lucero |
| 6,038,666 A | 3/2000 | Hsu |
| 6,048,269 A | 4/2000 | Burns |
| 6,050,895 A | 4/2000 | Luciano |
| 6,062,981 A | 5/2000 | Luciano |
| 6,068,552 A | 5/2000 | Walker |
| 6,077,163 A | 6/2000 | Walker |
| 6,089,975 A | 7/2000 | Dunn |
| 6,099,408 A | 8/2000 | Schneier |
| 6,104,815 A | 8/2000 | Alcorn |
| 6,106,396 A | 8/2000 | Alcorn |
| 6,110,041 A | 8/2000 | Walker et al. |
| 6,113,492 A | 9/2000 | Walker |
| 6,113,493 A | 9/2000 | Walker |
| 6,113,495 A | 9/2000 | Walker |
| 6,135,884 A | 10/2000 | Hedrick |
| 6,135,887 A | 10/2000 | Pease |
| 6,139,431 A | 10/2000 | Walker |
| 6,141,711 A | 10/2000 | Shah |
| 6,142,369 A | 11/2000 | Jonstromer |
| 6,149,522 A | 11/2000 | Alcorn |
| 6,161,059 A | 12/2000 | Tedesco |
| 6,162,121 A | 12/2000 | Morro |
| 6,162,122 A | 12/2000 | Acres |
| 6,174,234 B1 | 1/2001 | Seibert, Jr. |
| 6,182,221 B1 | 1/2001 | Hsu |
| 6,183,362 B1 | 2/2001 | Boushy |
| 6,190,256 B1 | 2/2001 | Walker |
| 6,206,283 B1 | 3/2001 | Bansal |
| 6,210,279 B1 | 4/2001 | Dickinson |
| 6,223,166 B1 | 4/2001 | Kay |
| 6,227,972 B1 | 5/2001 | Walker |
| 6,244,958 B1 | 6/2001 | Acres |
| 6,247,643 B1 | 6/2001 | Lucero |
| 6,253,119 B1 | 6/2001 | Dabrowski |
| 6,264,560 B1 | 7/2001 | Goldberg |
| 6,264,561 B1 | 7/2001 | Saffari |
| 6,267,671 B1 | 7/2001 | Hogan |
| 6,270,410 B1 | 8/2001 | Demar |
| 6,280,328 B1 | 8/2001 | Holch |
| 6,285,868 B1 | 9/2001 | Ladue |
| 6,293,866 B1 | 9/2001 | Walker |
| 6,302,790 B1 | 10/2001 | Brossard |
| 6,307,956 B1 | 10/2001 | Black |
| 6,319,125 B1 | 11/2001 | Acres |
| 6,341,353 B1 | 1/2002 | Herman |
| 6,368,216 B1 | 4/2002 | Hedrick |
| 6,371,852 B1 | 4/2002 | Acres |
| 6,378,073 B1 | 4/2002 | Davis |
| 6,379,246 B1 | 4/2002 | Dabrowski |
| 6,383,076 B1 | 5/2002 | Tiedeken |
| 6,409,595 B1 | 6/2002 | Uihlein |
| 6,409,602 B1 | 6/2002 | Wiltshire |
| 6,443,843 B1 | 9/2002 | Walker |
| 6,450,885 B2 | 9/2002 | Schneier |
| 6,488,585 B1 | 12/2002 | Wells |
| 6,496,928 B1 | 12/2002 | Deo |
| 6,530,835 B1 | 3/2003 | Walker |
| 6,561,903 B2 | 5/2003 | Walker |
| 6,581,161 B1 | 6/2003 | Byford |
| 6,582,310 B1 | 6/2003 | Walker |
| 6,585,598 B2 | 7/2003 | Nguyen |
| 6,628,939 B2 | 9/2003 | Paulsen |
| 6,634,550 B1 | 10/2003 | Walker et al. |
| 6,648,761 B1 | 11/2003 | Izawa et al. |
| 6,676,522 B2 | 1/2004 | Rowe et al. |
| 6,682,421 B1 | 1/2004 | Rowe |
| 6,685,567 B2 | 2/2004 | Cockerille |
| 6,702,670 B2 | 3/2004 | Jasper et al. |
| 6,712,191 B2 | 3/2004 | Hand |
| 6,712,698 B2 | 3/2004 | Paulsen et al. |
| D488,512 S | 4/2004 | Knobel |
| D490,473 S | 5/2004 | Knobel |
| 6,739,975 B2 | 5/2004 | Nguyen |
| 6,758,393 B1 | 7/2004 | Luciano |
| 6,800,029 B2 | 10/2004 | Rowe |
| 6,831,682 B1 | 12/2004 | Silverbrook et al. |
| 6,846,238 B2 | 1/2005 | Wells |
| 6,869,362 B2 | 3/2005 | Walker |
| 6,880,079 B2 | 4/2005 | Kelford |
| 6,896,618 B2 | 5/2005 | Benoy |
| 6,905,411 B2 | 6/2005 | Nguyen et al. |
| 6,935,957 B2 | 8/2005 | Yates et al. |
| 6,969,319 B2 | 11/2005 | Rowe et al. |
| 7,004,388 B2 | 2/2006 | Kohta |
| 7,004,837 B1 | 2/2006 | Crowder et al. |
| D523,482 S | 6/2006 | Uemizo |
| 7,153,210 B2 | 12/2006 | Yamagishi |
| 7,167,724 B2 | 1/2007 | Yamagishi |
| 7,169,052 B2 | 1/2007 | Beaulieu et al. |

(56) References Cited

U.S. PATENT DOCUMENTS

| | | |
|---|---|---|
| 7,213,750 B1 | 5/2007 | Barnes et al. |
| D547,806 S | 7/2007 | Uemizo |
| 7,275,991 B2 | 10/2007 | Burns |
| 7,331,520 B2 | 2/2008 | Silva |
| 7,335,106 B2 | 2/2008 | Johnson |
| 7,337,330 B2 | 2/2008 | Gatto |
| 7,341,522 B2 | 3/2008 | Yamagishi |
| 7,403,788 B2 | 7/2008 | Trioano et al. |
| 7,416,485 B2 | 8/2008 | Walker |
| 7,419,428 B2 | 9/2008 | Rowe |
| 7,467,999 B2 | 12/2008 | Walker |
| 7,477,889 B2 | 1/2009 | Kim |
| 7,510,474 B2 | 3/2009 | Carter, Sr. |
| 7,545,522 B1 | 6/2009 | Lou |
| 7,552,341 B2 | 6/2009 | Chen |
| 7,594,855 B2 | 9/2009 | Meyerhofer |
| 7,611,409 B2 | 11/2009 | Muir et al. |
| 7,644,861 B2 | 1/2010 | Alderucci |
| 7,693,306 B2 | 4/2010 | Huber |
| 7,699,703 B2 | 4/2010 | Muir |
| 7,701,344 B2 | 4/2010 | Mattice et al. |
| 7,740,538 B2 | 6/2010 | Nguyen et al. |
| 7,753,789 B2 | 7/2010 | Walker et al. |
| 7,758,420 B2 | 7/2010 | Saffari |
| 7,771,271 B2 | 8/2010 | Walker et al. |
| 7,785,193 B2 | 8/2010 | Paulsen et al. |
| 7,803,053 B2 | 9/2010 | Atkinson |
| D628,576 S | 12/2010 | Daniel |
| 7,846,017 B2 | 12/2010 | Walker et al. |
| 7,850,522 B2 | 12/2010 | Walker et al. |
| 7,883,417 B2 | 2/2011 | Bruzzese |
| 7,950,996 B2 | 5/2011 | Nguyen et al. |
| 7,988,550 B2 | 8/2011 | White |
| 7,997,972 B2 | 8/2011 | Nguyen et al. |
| 8,016,666 B2 | 9/2011 | Angell et al. |
| 8,023,133 B2 | 9/2011 | Kaneko |
| 8,038,527 B2 | 10/2011 | Walker et al. |
| 8,057,303 B2 | 11/2011 | Rasmussen |
| 8,070,598 B1 | 12/2011 | Guinn et al. |
| 8,079,904 B2 | 12/2011 | Griswold |
| 8,096,872 B2 | 1/2012 | Walker et al. |
| 8,118,668 B2 | 2/2012 | Gagner et al. |
| 8,144,356 B2 | 3/2012 | Meyerhofer |
| 8,157,642 B2 | 4/2012 | Paulsen |
| 8,192,276 B2 | 6/2012 | Walker et al. |
| 8,219,129 B2 | 7/2012 | Brown |
| 8,220,019 B2 | 7/2012 | Stearns et al. |
| 8,241,127 B2 | 8/2012 | Kovacs |
| 8,282,465 B2 | 10/2012 | Giobbi |
| 8,282,490 B2 | 10/2012 | Arezina |
| 8,286,856 B2 | 10/2012 | Meyerhofer et al. |
| 8,393,955 B2 | 3/2013 | Arezina et al. |
| 8,419,548 B2 | 4/2013 | Gagner |
| 8,469,800 B2 | 6/2013 | Lemay et al. |
| 8,512,144 B2 | 8/2013 | Johnson et al. |
| 8,550,903 B2 | 10/2013 | Lyons |
| 8,597,108 B2 | 12/2013 | Nguyen |
| 8,597,111 B2 | 12/2013 | Lemay et al. |
| 8,602,875 B2 | 12/2013 | Nguyen |
| 8,608,569 B2 | 12/2013 | Carrico |
| 8,613,659 B2 | 12/2013 | Nelson |
| 8,613,668 B2 | 12/2013 | Nelson et al. |
| 8,622,836 B2 | 1/2014 | Nelson et al. |
| 8,721,434 B2 | 5/2014 | Nelson et al. |
| 8,734,236 B2 | 5/2014 | Arezina et al. |
| 8,814,683 B2 | 8/2014 | Hollander et al. |
| 8,827,813 B2 | 9/2014 | Lemay et al. |
| 8,827,814 B2 | 9/2014 | Lemay et al. |
| 8,876,595 B2 | 11/2014 | Nelson et al. |
| 8,932,140 B2 | 1/2015 | Gagner et al. |
| 8,956,222 B2 | 2/2015 | Lemay et al. |
| 8,961,306 B2 | 2/2015 | Lemay |
| 8,978,868 B2 | 3/2015 | Johnson et al. |
| 9,011,236 B2 | 4/2015 | Nelson et al. |
| 9,153,095 B2 | 10/2015 | Adiraju et al. |
| 2001/0039204 A1 | 11/2001 | Tanskanen |
| 2001/0044337 A1 | 11/2001 | Rowe |
| 2002/0020603 A1 | 2/2002 | Jones |
| 2002/0061778 A1 | 5/2002 | Acres |
| 2002/0077182 A1 | 6/2002 | Swanberg |
| 2002/0082070 A1 | 6/2002 | Macke et al. |
| 2002/0087641 A1 | 7/2002 | Levosky |
| 2002/0090986 A1 | 7/2002 | Cote et al. |
| 2002/0094869 A1 | 7/2002 | Harkham |
| 2002/0107066 A1 | 8/2002 | Seelig |
| 2002/0111206 A1 | 8/2002 | Van Baltz et al. |
| 2002/0111209 A1 | 8/2002 | Walker |
| 2002/0132664 A1 | 9/2002 | Miller et al. |
| 2002/0132666 A1 | 9/2002 | Lind |
| 2002/0145035 A1 | 10/2002 | Jones |
| 2002/0147047 A1 | 10/2002 | Letovsky |
| 2002/0147049 A1 | 10/2002 | Carter, Sr. |
| 2002/0163570 A1 | 11/2002 | Phillips |
| 2002/0169623 A1 | 11/2002 | Call et al. |
| 2002/0183046 A1 | 12/2002 | Joyce et al. |
| 2002/0196342 A1 | 12/2002 | Walker |
| 2003/0003988 A1 | 1/2003 | Walker |
| 2003/0008707 A1 | 1/2003 | Walker et al. |
| 2003/0027632 A1 | 2/2003 | Sines |
| 2003/0032485 A1 | 2/2003 | Cockerille |
| 2003/0045354 A1 | 3/2003 | Giobbi |
| 2003/0054868 A1 | 3/2003 | Paulsen et al. |
| 2003/0054881 A1 | 3/2003 | Hedrick |
| 2003/0064805 A1 | 4/2003 | Wells |
| 2003/0074259 A1 | 4/2003 | Slyman et al. |
| 2003/0083126 A1 | 5/2003 | Paulsen |
| 2003/0083943 A1 | 5/2003 | Adams |
| 2003/0092477 A1 | 5/2003 | Luciano et al. |
| 2003/0104865 A1 | 6/2003 | Itkis |
| 2003/0141359 A1 | 7/2003 | Dymovsky |
| 2003/0144052 A1 | 7/2003 | Walker |
| 2003/0148812 A1 | 8/2003 | Paulsen |
| 2003/0162591 A1 | 8/2003 | Nguyen et al. |
| 2003/0172037 A1 | 9/2003 | Jung |
| 2003/0186739 A1 | 10/2003 | Paulsen et al. |
| 2003/0199321 A1 | 10/2003 | Williams |
| 2003/0203756 A1 | 10/2003 | Jackson |
| 2003/0224852 A1 | 12/2003 | Walker |
| 2003/0228900 A1 | 12/2003 | Yamagishi |
| 2004/0014514 A1 | 1/2004 | Yacenda |
| 2004/0016797 A1 | 1/2004 | Jones |
| 2004/0023721 A1 | 2/2004 | Giobbi |
| 2004/0039635 A1 | 2/2004 | Linde |
| 2004/0043814 A1 | 3/2004 | Angell et al. |
| 2004/0082380 A1 | 4/2004 | George et al. |
| 2004/0085293 A1 | 5/2004 | Soper |
| 2004/0088250 A1 | 5/2004 | Bartter et al. |
| 2004/0106454 A1 | 6/2004 | Walker |
| 2004/0127277 A1 | 7/2004 | Walker |
| 2004/0129773 A1 | 7/2004 | Lute, Jr. |
| 2004/0147314 A1 | 7/2004 | Lemay |
| 2004/0185935 A1 | 9/2004 | Yamagishi |
| 2004/0190042 A1 | 9/2004 | Ferlitsch et al. |
| 2004/0192434 A1 | 9/2004 | Walker |
| 2004/0199284 A1 | 10/2004 | Hara |
| 2004/0209690 A1 | 10/2004 | Bruzzese |
| 2004/0225565 A1 | 11/2004 | Selman |
| 2004/0230527 A1 | 11/2004 | Hansen et al. |
| 2004/0259640 A1 | 12/2004 | Gentles |
| 2004/0266395 A1 | 12/2004 | Pailles |
| 2005/0014554 A1 | 1/2005 | Walker |
| 2005/0020354 A1 | 1/2005 | Nguyen et al. |
| 2005/0049049 A1 | 3/2005 | Griswold et al. |
| 2005/0054438 A1 | 3/2005 | Rothschild |
| 2005/0059485 A1 | 3/2005 | Paulsen |
| 2005/0070257 A1 | 3/2005 | Saarinen |
| 2005/0076242 A1 | 4/2005 | Breuer |
| 2005/0101383 A1 | 5/2005 | Wells |
| 2005/0130728 A1 | 6/2005 | Nguyen |
| 2005/0173220 A1 | 8/2005 | Liu et al. |
| 2005/0022771 A1 | 10/2005 | Nelson et al. |
| 2005/0227770 A1 | 10/2005 | Papulov |
| 2005/0240484 A1 | 10/2005 | Yan |
| 2005/0255911 A1 | 11/2005 | Nguyen et al. |

(56) References Cited

U.S. PATENT DOCUMENTS

| | | |
|---|---|---|
| 2005/0287852 A1 | 12/2005 | Sugawara |
| 2006/0018450 A1 | 1/2006 | Sandberg-Diment |
| 2006/0019745 A1 | 1/2006 | Benbrahim |
| 2006/0025206 A1 | 2/2006 | Walker |
| 2006/0025222 A1 | 2/2006 | Sekine |
| 2006/0035707 A1 | 2/2006 | Nguyen |
| 2006/0040741 A1 | 2/2006 | Griswold |
| 2006/0046823 A1 | 3/2006 | Kaminkow |
| 2006/0046834 A1 | 3/2006 | Sekine |
| 2006/0046842 A1 | 3/2006 | Mattice |
| 2006/0046855 A1 | 3/2006 | Nguyen et al. |
| 2006/0049624 A1 | 3/2006 | Brosnan et al. |
| 2006/0064372 A1 | 3/2006 | Gupta |
| 2006/0079333 A1 | 4/2006 | Morrow |
| 2006/0089174 A1 | 4/2006 | Twerdahl |
| 2006/0118382 A1 | 6/2006 | Yoshioka |
| 2006/0160621 A1 | 7/2006 | Rowe et al. |
| 2006/0165060 A1 | 7/2006 | Dua |
| 2006/0166732 A1 | 7/2006 | Lechner et al. |
| 2006/0166741 A1 | 7/2006 | Boyd et al. |
| 2006/0173781 A1 | 8/2006 | Donner |
| 2006/0189382 A1 | 8/2006 | Muir |
| 2006/0223627 A1 | 10/2006 | Nozaki |
| 2006/0226598 A1 | 10/2006 | Walker |
| 2006/0246981 A1 | 11/2006 | Walker et al. |
| 2006/0247037 A1 | 11/2006 | Park |
| 2006/0258439 A1 | 11/2006 | White |
| 2006/0266598 A1 | 11/2006 | Baumgartner et al. |
| 2006/0271433 A1 | 11/2006 | Hughes |
| 2006/0279781 A1 | 12/2006 | Kaneko |
| 2006/0281554 A1 | 12/2006 | Gatto et al. |
| 2006/0287072 A1 | 12/2006 | Walker |
| 2006/0287095 A1 | 12/2006 | Mattice |
| 2006/0287098 A1 | 12/2006 | Morrow et al. |
| 2007/0017979 A1 | 1/2007 | Wu et al. |
| 2007/0021198 A1 | 1/2007 | Muir |
| 2007/0060302 A1 | 3/2007 | Fabbri |
| 2007/0060326 A1 | 3/2007 | Juds et al. |
| 2007/0060372 A1 | 3/2007 | Yamagishi |
| 2007/0117608 A1 | 5/2007 | Roper et al. |
| 2007/0117623 A1 | 5/2007 | Nelson |
| 2007/0129150 A1 | 6/2007 | Crowder et al. |
| 2007/0129151 A1 | 6/2007 | Crowder et al. |
| 2007/0155469 A1 | 7/2007 | Johnson |
| 2007/0159301 A1 | 7/2007 | Hirt |
| 2007/0174809 A1 | 7/2007 | Brown |
| 2007/0190494 A1 | 8/2007 | Rosenberg |
| 2007/0197247 A1 | 8/2007 | Inselberg |
| 2007/0202941 A1 | 8/2007 | Miltenberger et al. |
| 2007/0218971 A1 | 9/2007 | Berube |
| 2007/0218985 A1 | 9/2007 | Okada |
| 2007/0218991 A1 | 9/2007 | Okada |
| 2007/0238505 A1 | 10/2007 | Okada |
| 2007/0243927 A1 | 10/2007 | Soltys |
| 2007/0243928 A1 | 10/2007 | Iddings |
| 2007/0267488 A1 | 11/2007 | Chang |
| 2008/0011832 A1 | 1/2008 | Chang |
| 2008/0026816 A1 | 1/2008 | Sammon |
| 2008/0026823 A1 | 1/2008 | Wolf et al. |
| 2008/0026844 A1 | 1/2008 | Wells |
| 2008/0070671 A1 | 3/2008 | Okada |
| 2008/0076528 A1 | 3/2008 | Nguyen et al. |
| 2008/0076571 A1* | 3/2008 | Frerking ............ G07F 17/3255 463/42 |
| 2008/0076572 A1 | 3/2008 | Nguyen et al. |
| 2008/0085753 A1 | 4/2008 | Okada |
| 2008/0139306 A1 | 6/2008 | Lutnick |
| 2008/0166997 A1 | 7/2008 | Sun et al. |
| 2008/0182644 A1 | 7/2008 | Lutnick et al. |
| 2008/0200240 A1 | 8/2008 | Saltiel et al. |
| 2008/0200251 A1 | 8/2008 | Alderucci et al. |
| 2008/0207296 A1 | 8/2008 | Lutnick et al. |
| 2008/0213026 A1 | 9/2008 | Grabiec |
| 2008/0220878 A1 | 9/2008 | Michaelis |
| 2008/0234028 A1 | 9/2008 | Meyer et al. |
| 2008/0261682 A1 | 10/2008 | Phillips |
| 2008/0268934 A1 | 10/2008 | Mattice et al. |
| 2008/0270302 A1 | 10/2008 | Beenau et al. |
| 2008/0293483 A1 | 11/2008 | Pickus |
| 2008/0300047 A1 | 12/2008 | Nagano |
| 2008/0300061 A1 | 12/2008 | Zheng |
| 2008/0305860 A1 | 12/2008 | Linner |
| 2008/0305862 A1 | 12/2008 | Walker et al. |
| 2008/0305873 A1 | 12/2008 | Zheng |
| 2008/0311971 A1 | 12/2008 | Dean |
| 2008/0318655 A1 | 12/2008 | Davies |
| 2009/0011821 A1 | 1/2009 | Griswold |
| 2009/0023490 A1 | 1/2009 | Moshal |
| 2009/0029766 A1 | 1/2009 | Lutnick |
| 2009/0054149 A1 | 2/2009 | Brosnan et al. |
| 2009/0098943 A1 | 4/2009 | Weber et al. |
| 2009/0124350 A1 | 5/2009 | Iddings et al. |
| 2009/0124376 A1 | 5/2009 | Kelly et al. |
| 2009/0125429 A1 | 5/2009 | Takayama |
| 2009/0131134 A1 | 5/2009 | Baerlocher et al. |
| 2009/0131146 A1 | 5/2009 | Arezina et al. |
| 2009/0158400 A1 | 6/2009 | Miyake |
| 2009/0176565 A1 | 7/2009 | Kelly |
| 2009/0186680 A1 | 7/2009 | Napolitano |
| 2009/0197684 A1 | 8/2009 | Arezina |
| 2009/0227317 A1 | 9/2009 | Spangler |
| 2009/0233715 A1 | 9/2009 | Ergen |
| 2009/0275397 A1 | 11/2009 | Van Baltz et al. |
| 2009/0299833 A1 | 12/2009 | Estep et al. |
| 2009/0313084 A1 | 12/2009 | Chugh |
| 2009/0328144 A1 | 12/2009 | Sherlock et al. |
| 2010/0012715 A1 | 1/2010 | Williams |
| 2010/0016075 A1 | 1/2010 | Thomas |
| 2010/0029376 A1 | 2/2010 | Hardy et al. |
| 2010/0036758 A1 | 2/2010 | Monk |
| 2010/0048291 A1 | 2/2010 | Warkentin |
| 2010/0048297 A1 | 2/2010 | Dasgupta |
| 2010/0062840 A1 | 3/2010 | Herrmann |
| 2010/0069160 A1 | 3/2010 | Barrett |
| 2010/0087241 A1 | 4/2010 | Nguyen |
| 2010/0087249 A1 | 4/2010 | Rowe |
| 2010/0093421 A1 | 4/2010 | Nyman |
| 2010/0093429 A1 | 4/2010 | Mattice |
| 2010/0094734 A1 | 4/2010 | Wang |
| 2010/0113061 A1 | 5/2010 | Holcman |
| 2010/0113161 A1 | 5/2010 | Walker |
| 2010/0155462 A1 | 6/2010 | Morrison et al. |
| 2010/0173691 A1 | 7/2010 | Wolfe |
| 2010/0174650 A1 | 7/2010 | Nonaka |
| 2010/0178986 A1 | 7/2010 | Davis et al. |
| 2010/0222100 A1 | 8/2010 | Fisk |
| 2010/0219234 A1 | 9/2010 | Forbes |
| 2010/0225653 A1 | 9/2010 | Sao et al. |
| 2010/0227670 A1 | 9/2010 | Arezina et al. |
| 2010/0234099 A1 | 9/2010 | Rasmussen |
| 2010/0250787 A1 | 9/2010 | Miyata |
| 2010/0304848 A1 | 12/2010 | Detlefsen |
| 2010/0323785 A1 | 12/2010 | Motyl |
| 2010/0323789 A1 | 12/2010 | Gabriele |
| 2010/0331079 A1 | 12/2010 | Bytnar |
| 2011/0015976 A1 | 1/2011 | Lempel et al. |
| 2011/0028199 A1 | 2/2011 | Luciano et al. |
| 2011/0035319 A1 | 2/2011 | Brand et al. |
| 2011/0057028 A1 | 3/2011 | Schwartz |
| 2011/0065496 A1 | 3/2011 | Gagner et al. |
| 2011/0065497 A1 | 3/2011 | Patterson, Jr. |
| 2011/0070940 A1 | 3/2011 | Jaffe |
| 2011/0076963 A1 | 3/2011 | Hatano |
| 2011/0086691 A1 | 4/2011 | Luciano et al. |
| 2011/0086696 A1 | 4/2011 | Macewan |
| 2011/0098104 A1 | 4/2011 | Meyerhofer |
| 2011/0118008 A1 | 5/2011 | Taylor |
| 2011/0119098 A1 | 5/2011 | Miller |
| 2011/0136576 A1 | 6/2011 | Kammler et al. |
| 2011/0166989 A1 | 7/2011 | Ross et al. |
| 2011/0207531 A1 | 8/2011 | Gagner |
| 2011/0208418 A1 | 8/2011 | Looney et al. |
| 2011/0242565 A1 | 10/2011 | Armstrong |
| 2011/0263325 A1 | 10/2011 | Atkinson |

(56) References Cited

U.S. PATENT DOCUMENTS

| | | |
|---|---|---|
| 2011/0281655 A1 | 11/2011 | Nguyen et al. |
| 2011/0287823 A1 | 11/2011 | Guinn et al. |
| 2011/0295668 A1 | 12/2011 | Charania |
| 2011/0300928 A1 | 12/2011 | Benbrahim |
| 2011/0306400 A1 | 12/2011 | Nguyen |
| 2011/0306401 A1 | 12/2011 | Nguyen |
| 2011/0307318 A1 | 12/2011 | Laporte et al. |
| 2011/0314153 A1 | 12/2011 | Bathiche |
| 2012/0015735 A1 | 1/2012 | Abouchar |
| 2012/0046110 A1 | 2/2012 | Amaitis |
| 2012/0047008 A1 | 3/2012 | Alhadeff et al. |
| 2012/0066048 A1 | 3/2012 | Foust et al. |
| 2012/0067944 A1 | 3/2012 | Ross |
| 2012/0072111 A1 | 3/2012 | Davis |
| 2012/0084131 A1 | 4/2012 | Bergel et al. |
| 2012/0094757 A1 | 4/2012 | Vago |
| 2012/0115593 A1 | 5/2012 | Vann et al. |
| 2012/0122529 A1 | 5/2012 | Lyons |
| 2012/0122558 A1* | 5/2012 | Lyons .................... G05B 15/02 463/25 |
| 2012/0122584 A1 | 5/2012 | Nguyen |
| 2012/0122585 A1 | 5/2012 | Nguyen |
| 2012/0129586 A1 | 5/2012 | Lutnick |
| 2012/0129611 A1 | 5/2012 | Rasmussen |
| 2012/0149561 A1 | 6/2012 | Ribi et al. |
| 2012/0184367 A1 | 7/2012 | Parrott et al. |
| 2012/0187187 A1 | 7/2012 | Duff |
| 2012/0190455 A1 | 7/2012 | Briggs |
| 2012/0208627 A1 | 8/2012 | Kitakaze et al. |
| 2012/0221474 A1 | 8/2012 | Eicher et al. |
| 2012/0239552 A1 | 9/2012 | Harycki |
| 2012/0252556 A1 | 10/2012 | Doyle et al. |
| 2012/0265681 A1 | 10/2012 | Ross |
| 2012/0276990 A1 | 11/2012 | Arezina |
| 2012/0290336 A1 | 11/2012 | Rosenblatt |
| 2012/0296174 A1 | 11/2012 | McCombie |
| 2012/0300753 A1 | 11/2012 | Brown |
| 2012/0311322 A1 | 12/2012 | Koyun |
| 2012/0315984 A1 | 12/2012 | Carrico et al. |
| 2012/0324135 A1 | 12/2012 | Goodman |
| 2013/0013389 A1 | 1/2013 | Vitti et al. |
| 2013/0017877 A1 | 1/2013 | Dahl |
| 2013/0017884 A1 | 1/2013 | Price |
| 2013/0023339 A1 | 1/2013 | Davis |
| 2013/0053133 A1 | 2/2013 | Schueller |
| 2013/0053136 A1 | 2/2013 | Lemay et al. |
| 2013/0053148 A1 | 2/2013 | Nelson et al. |
| 2013/0065667 A1 | 3/2013 | Nelson et al. |
| 2013/0065668 A1 | 3/2013 | Lemay et al. |
| 2013/0065678 A1 | 3/2013 | Nelson et al. |
| 2013/0065686 A1 | 3/2013 | Lemay et al. |
| 2013/0085943 A1 | 4/2013 | Takeda et al. |
| 2013/0090155 A1 | 4/2013 | Johnson |
| 2013/0124413 A1 | 5/2013 | Itwaru |
| 2013/0130777 A1 | 5/2013 | Lemay et al. |
| 2013/0130778 A1 | 5/2013 | Anderson et al. |
| 2013/0130779 A1* | 5/2013 | Gagner ............... G07F 17/3267 463/25 |
| 2013/0137509 A1 | 5/2013 | Weber et al. |
| 2013/0137510 A1 | 5/2013 | Weber et al. |
| 2013/0137516 A1 | 5/2013 | Griswold et al. |
| 2013/0165199 A1 | 6/2013 | Lemay |
| 2013/0165208 A1 | 6/2013 | Nelson |
| 2013/0165209 A1 | 6/2013 | Lemay |
| 2013/0165210 A1 | 6/2013 | Nelson |
| 2013/0165231 A1 | 6/2013 | Nelson |
| 2013/0165232 A1 | 6/2013 | Nelson |
| 2013/0190077 A1 | 7/2013 | Arezina et al. |
| 2013/0196755 A1 | 8/2013 | Nelson |
| 2013/0225279 A1 | 8/2013 | Patceg et al. |
| 2013/0244772 A1* | 9/2013 | Weber .................... G06F 21/42 463/29 |
| 2013/0252713 A1 | 9/2013 | Nelson |
| 2013/0260889 A1 | 10/2013 | Lemay et al. |
| 2013/0275314 A1 | 10/2013 | Bowles |
| 2013/0299574 A1 | 11/2013 | Theobald |
| 2013/0316808 A1 | 11/2013 | Nelson |
| 2013/0317987 A1 | 11/2013 | Tsutsui |
| 2013/0324237 A1 | 12/2013 | Adiraju et al. |
| 2013/0337890 A1 | 12/2013 | Earley et al. |
| 2013/0344942 A1 | 12/2013 | Price et al. |
| 2014/0018153 A1 | 1/2014 | Nelson et al. |
| 2014/0045586 A1 | 2/2014 | Allen et al. |
| 2014/0080578 A1 | 3/2014 | Nguyen |
| 2014/0087865 A1 | 3/2014 | Carrico et al. |
| 2014/0121005 A1 | 5/2014 | Nelson et al. |
| 2014/0200065 A1 | 7/2014 | Anderson |
| 2014/0221099 A1 | 8/2014 | Johnson |
| 2014/0248941 A1 | 9/2014 | Nelson et al. |
| 2014/0274306 A1 | 9/2014 | Crawford, III |
| 2014/0323206 A1 | 10/2014 | Gagner et al. |
| 2014/0357353 A1 | 12/2014 | Popovich |
| 2015/0012305 A1 | 1/2015 | Truskovsky |
| 2015/0065231 A1 | 3/2015 | Anderson et al. |
| 2015/0087408 A1 | 3/2015 | Siemasko et al. |
| 2015/0170473 A1 | 6/2015 | Hematji et al. |
| 2015/0187158 A1 | 7/2015 | Johnson et al. |
| 2015/0319613 A1 | 11/2015 | Shmilov |
| 2016/0071373 A1 | 3/2016 | Anderson et al. |
| 2016/0093166 A1 | 3/2016 | Panambur et al. |

FOREIGN PATENT DOCUMENTS

| | | |
|---|---|---|
| JP | 2001-243376 | 9/2001 |
| JP | 2002-123619 | 4/2002 |
| JP | 2007-082934 | 4/2007 |
| JP | 2007-141055 | 6/2007 |
| JP | 2007-328388 | 12/2007 |
| JP | 2008-027117 | 7/2008 |
| JP | 2008-171203 | 7/2008 |
| JP | 2008-228848 | 10/2008 |
| JP | 2008-287446 | 11/2008 |
| JP | 2009-015829 | 1/2009 |
| JP | 2009-048376 | 3/2009 |
| JP | 2009-258799 | 11/2009 |
| JP | 2010-009161 | 1/2010 |
| WO | WO 2007/142980 | 12/2007 |
| WO | WO 2009/026320 | 2/2009 |
| WO | WO 2012/112602 | 8/2012 |

OTHER PUBLICATIONS

EZ Pay® Ticketing Advertisement, written by IGT, published in 2013 (1 page).

IGT Advantage® sb NexGen® II Advertisement, written by IGT, published in 2010 (2 pages).

"JCM Global, Techfirm Inc. and NRT Technology Corp. to Present First Fully Integrated NFC-Based Interactive Mobile Wager Network That Connects Player, Mobile Wager Wallet, QuickJack™ ATM and Gaming Device" online article published Oct. 1, 2012, retrieved from http://finance.yahoo.com/news/jcm-global-techfirm-inc-nrt-150000276.html (5 pages).

European Patent Office, Extended European Search Report in corresponding European Application No. EP16190274.7, dated Feb. 28, 2017 (9 pages).

\* cited by examiner

VIRTUALIZED MAGNETIC PLAYER CARD

PRIORITY CLAIM

This application is a continuation of, claims priority to and the benefit of U.S. patent application Ser. No. 15/487,135, filed on Apr. 13, 2017 which is a continuation of, claims priority to and the benefit of U.S. patent application Ser. No. 14/330,241, filed on Jul. 14, 2014, which is a divisional of, claims priority to and the benefit of U.S. patent application Ser. No. 13/408,587, filed on Feb. 29, 2012, the entire contents of each are incorporated by reference herein.

TECHNICAL FIELD

The described embodiments relate generally to wager gaming systems, such as gaming systems deployed in a casino enterprise. More particularly, they relate to player tracking systems, also referred to as loyalty programs.

BACKGROUND

Developing and maintaining a loyal customer base is a critical component of operating a successful casino enterprise. To develop a loyal customer base, casino enterprises offer customers the chance to participate in a loyalty program that allows their activities to be tracked. These programs are often referred to internally within the casino enterprise as player tracking systems. For a customer to participate in a loyalty program, the casino enterprise creates an account for the customer and requires the customer to provide identification information, such as their name and address. The identification information is stored to the account. An instrument, such as a magnetic striped card, is provided to the customer. The instrument can include an account number associated with the loyalty program account created for the customer. The customer may also be provided with a username and password, although generally all that is needed by the customer is the magnetic-striped card and inserting or swiping it at a card bezel at a gaming device.

The instrument is utilized during various activities within the casino enterprise so that a record of the customer's activities are generated and stored to an account associated with the instrument. As an example, a customer can insert a magnetic-striped player tracking card into a card reader associated with a slot machine to have a record of their gaming activity on the slot machine stored to the account associated with the player tracking card.

As noted, physical magnetic-striped cards are used for identifying and tracking a patron's play while at the casino. This card has a unique account number that is tied to the patron's player tracking account on the back-end of casino's gaming operations. Through the use of these cards, the casino is able to track a patron's game play habits and tendencies and offer rewards for play and loyalty.

The physical cards are issued to patrons at each casino in which they chose to participate in the loyalty program. Many times this results in a patron having numerous cards to keep track of and to carry with them if going to different casinos. If a player is at a casino and she does not have the specific card for that property, then she will not be able to have her play accounted for without applying for a replacement card. That process can take time depending on how busy the casino is. In addition, a common problem with physical cards is that they get left, either intentionally or unintentionally, in the gaming machine when a patron is done playing. This usually results in the card being abandoned by the player tracking system after some amount of time which results in the patron having to visit the player club booth to be re-issued a new card the next time she plays at that property. In other scenarios, patrons will intentionally leave their cards in the gaming machine hoping that an unsuspecting player will play the machine and contribute their play to the "abandoned" card. This results in the owner of the card receiving points and benefits for play they did not pay for. Another disadvantage of physical cards is the cost of those cards for new customers and the continuing cost of replacement cards due to damage, loss and abandonment.

SUMMARY

One aspect of the present invention is a method of implementing a player tracking system (also referred to as a loyalty program) on a gaming machine without the use of physical loyalty program cards, typically magnetic-striped cards. A gaming device, such as an electronic gaming machine in a gaming network, detects a "card-in" activation. In most scenarios, this is done by a patron pressing a "card-in" softkey displayed in a service window on the gaming device display. The card-in softkey may be displayed after the patron has selected the gaming establishment's loyalty program softkey. In one embodiment, the gaming device may then receive a virtual player tracking card PIN entered by the patron at the gaming device using a soft keypad in the service window. This PIN is transmitted to a player tracking service (PTS) server. In one embodiment, this is the only item of information that is transmitted "upstream" to the PTS server from the gaming device. No other information, such as the PTS data typically stored on the loyalty program magnetic strip card, is transmitted from the device to the server or another other component in the gaming network. A validation or confirmation is received that the virtual player tracking card PIN is associated with an authorized patron who previously logged into the player tracking system using a mobile device. At this stage, the patron is tied with a specific gaming machine and may begin player tracked game play on the gaming machine or device. At some point, the gaming machine may detect a "card-out" activation by the patron at which stage the player tracking session ends.

Another aspect of the invention is a method of implementing a player tracking system in a gaming network. A virtual player tracking card identifier and password are received at a player tracking server from a system app server. The identifier and password are authenticated or verified as corresponding to a registered player tracking system patron at the casino. If verified, the player tracking system generates a virtual player tracking card PIN and transmits it to the mobile device via the system app server and one or more wide area network, such as a cellular phone network and the Internet. The player tracking system receives the virtual player tracking card PIN from a gaming machine when the patron enters the PIN through a softkey pad in the service window interlace at the gaming machine. The gaming machine is that transmitted the PIN to the server is identified and tied to the player tracking session. The player tracking account is then credited with the virtual player tracking card PIN based on game play on the gaming machine.

Another aspect of the present invention is a gaming network having a player tracking system and virtual player tracking card functionality. The network may contain a gaming server having a virtual player tracking card authentication module. It may also have a data storage component storing player tracking data records where a record has at least one field used solely for enabling a virtual player tracking card. The network may also have a system app server that is able to connect to a mobile device network. It may also contain a gaming machine having a virtual player card component.

BRIEF DESCRIPTION OF THE FIGURES

The embodiments will be readily understood by the following detailed description in conjunction with the accompanying drawings, wherein like reference numerals designate like structural elements, and in which.

DETAILED DESCRIPTION

Figure 1:
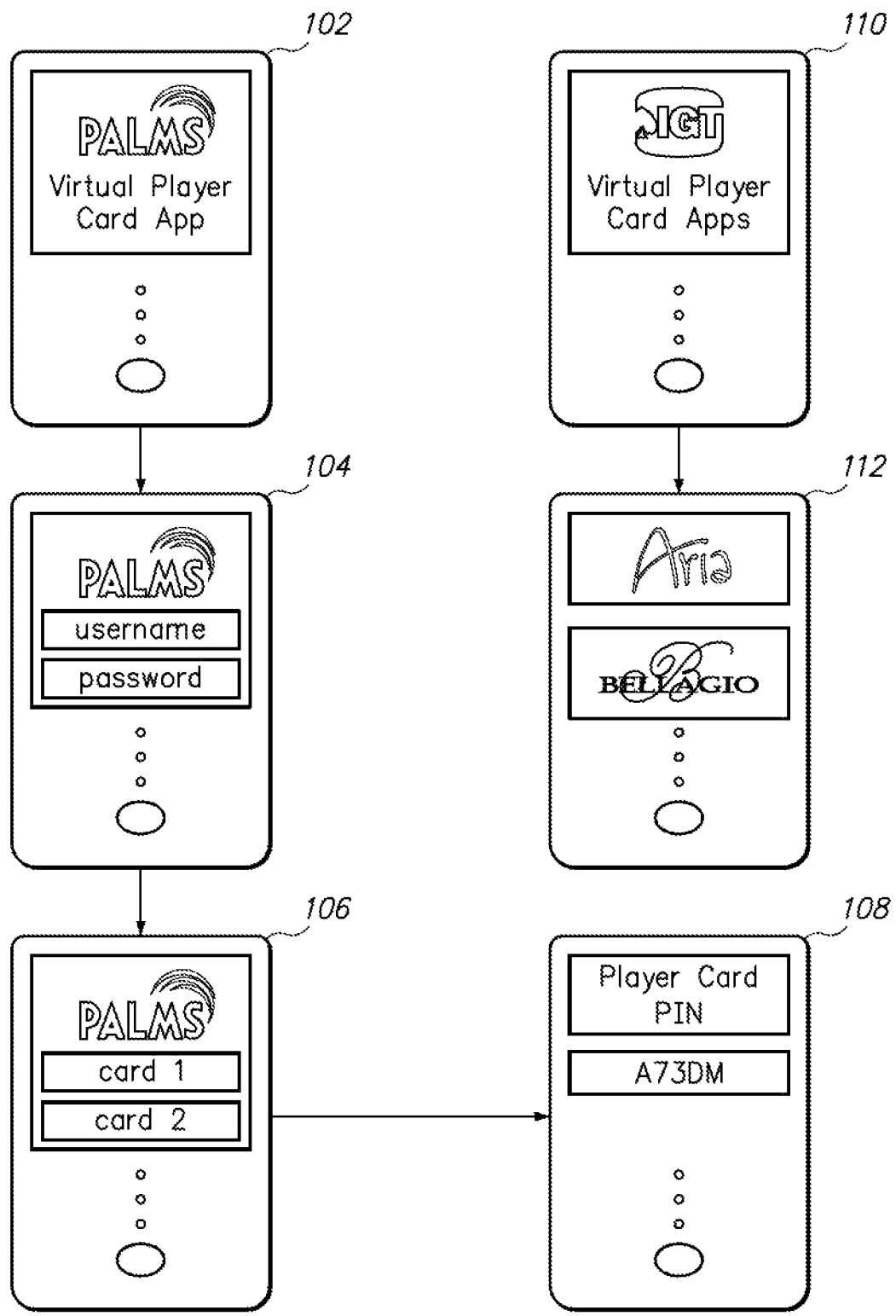
FIG. 1 shows a series of screen shots of two different formats of player tracking apps in accordance with the described embodiments.

A gaming system compatible with mobile devices, such as smart phones and tablets, which can be used by casino patrons to participate in a loyalty program without the need for physical player tracking cards is described. A casino patron can log in to a casino player tracking system using her mobile device. In this manner, the patron can log in before arriving at the casino or physically being at a gaming machine. The patron no longer needs a physical card of any sort. The information that the patron enters at the gaming machine will be stored on her mobile device. In this sense, the card has been "virtualized" in that the necessary loyalty program information is now transmitted over a network to a mobile device and can be stored and utilized by a casino patron at any time within a predefined expiration period for the data.

The casino makes available for download a "virtual player card" app which can be downloaded by the loyalty program patron which can be used to log in to the casino's player tracking system. Once the player tracking system verifies that the mobile device user is a registered loyalty program patron, the patron may receive a player tracking PIN on her mobile device. As described in detail below, this player tracking PIN is entered at the gaming machine, for example via a softkey pad, to initiate player tracked game play. In another embodiment, the patron selects a PIN when she initially registers with the player tracking program at the player's club booth. In this embodiment, the player selects a PIN that is easy for her to remember, such as the last four digits of her social security number or birthday. The player tracking system checks whether the PIN is unique and available. If it is not, the player is asked to select another one. All relevant patron data relating to the loyalty program may then be displayed on the gaming machine, such as in a service window interface, as if the patron had inserted a valid physical player tracking card. A card bezel may indicate that a physical card was inserted even though one was not. The system proceeds in a conventional manner from that point, tracking all the wager game play and updating account information in the usual manner. The same restrictions with respect to multiple player card usage and tracking play by multiple, non-registered users may apply (e.g., restrictions on bonus play, extra credit, etc.). When the patron is finished playing on a particular machine, she can press a "Card Out" soft key (or a soft key labeled "End Loyalty Program Game Play" or something similar) to end the session. In this manner, embodying a physical player tracking card on a patron-owned and controlled mobile device addresses several of the problems with physical cards and provides a seamless and less problematic way for a patron to access a player tracking system.

Presently, when a patron decides to become a member of a particular casino's loyalty program, also called "player's club," she registers with the casino to open a player tracking account. This is typically done by having the patron go to a player's club window or booth and provide personal information. The patron would then (or at some point) be given a player tracking card. In the described embodiment of the present invention, the patron may still receive a physical card if desired. However, with the present invention, the new loyalty program patron would be asked if she would like to use the loyalty program mobile application (herein after "app") for her smart phone or mobile device to enable remote log into the player tracking system (and would be told of the advantages of the app). If the patron wants the loyalty program app, she is asked to decide on a loyalty program username and password which will be used with the app. The PIN selected by the patron may be checked to see if it is available. If not, she is asked to select another PIN. The patron may then go to the appropriate online app marketplace for their particular mobile carrier and download the player tracking app that allows them to login to the casino through their smart phone. If desired by the patron, this may be done with the assistance of the casino employee at the time of initial loyalty program registration. Once the patron is registered, the app is downloaded, and the patron has her loyalty program username and password, she is enabled to begin "player tracked" play on a gaming machine.

FIG. 1 shows screen shots of two different sequences showing different formats of player tracking apps in accordance with one embodiment. The app may be downloaded in various formats or may be packaged and branded by the casino in different ways. If a patron generally uses the loyalty program at one casino and only wants the player card app for that casino, she can download the app that is created and branded only by that casino, if one is available. For example, screen shot 102 shows an icon for a Palms Casino Virtual Player Card App. The mobile device may be a smart phone running a specific operating system, such as iOS, Android, or Windows Phone, and has access to their respective app market places. Upon activating the app, in one embodiment, the patron is presented with screen shot 104 where she is asked to enter a loyalty program user name and loyalty program password. These are data that were provided to the patron either during registration in the loyalty program or subsequently upon request by the patron (for example, the patron may have heard about the "virtual player club card" app through casino marketing). In other embodiments, at the patron may only be required to enter a loyalty program password and the patron's loyalty program user name may be provided automatically by the app which obtains the user's identity from the mobile device software or the app may be customized to automatically provide the loyalty program user name. Depending on the security requirements of the casino and the security of the phone the password may also be provided automatically or may be recalled from the time it was previously entered.

After the patron enters a loyalty program user name and password, this information is transmitted to an app system server, described below, typically under control of the casino operator. The data may be transmitted over a cellular data network operated by a mobile carrier. Screen shot 106 shows two player tracking cards of which the patron can select one. If the patron has more cards, they can be displayed in a suitable format as desired by the casino operator and app designer. In this case, only the player tracking card or cards that the patron has for the Palms Casino are displayed. The patron selects one of the player cards (e.g., by touching the icon on the smart phone display) and is the provided with a player tracking card PIN as shown in screen shot 108.

In one embodiment, the PIN is generated by a component in the player tracking system under control of the casino operator. In another embodiment, the patron can select her own PIN (e.g., a four-digit number) and the system checks whether the PIN is available. If not, then the system informs the patron and she is asked to select another PIN. This PIN may then be entered by the patron when she is at a gaming machine and wants to start player tracked game play. In other embodiments, a PIN is not be transmitted to the patron's mobile device. The patron may only have to log in to the player tracking system remotely and select a player card. No other steps are needed with respect to operations on the mobile device. When the patron arrives at a gaming machine, unique information or data of the patron may be used to tie the patron to a particular gaming machine, such as a form of biometric data (e.g., fingerprint, facial scan, retina scan, and the like). In this embodiment, the flow of data is uni-directional from the mobile device to the system app server (upstream); the mobile device would not need to receive any data from the casino operator. In another embodiment, a bar code or QR code may be provided to the patron which she can have scanned at the gaming machine instead of having to enter a PIN or provide biometric data.

In another sequence of events, the casino operator may not develop an exclusive app for its virtual player card system, but rather have a gaming provider (e.g., an entity that provides the components needed for implementing a loyalty program) develop and administer the virtual player card app. When a patron registers for a loyalty program (or existing loyalty program patrons) may download an app from the gaming provider (as opposed to casino operator), such as IGT, Inc. or Reno, Nev., which can be used to log into and access one or more casino player tracking systems, where each casino uses the gaming provider's player tracking system components. Mobile device screen shot 110 shows an app called "IGT Virtual Player Card Apps." The patron can download this app from an app marketplace or store in the same manner as she downloaded the casino-specific virtual card app shown in screen shot 102. This allows a patron who is a member of a number of loyalty programs at different casinos can download multiple apps for implementing virtual player cards.

Upon executing the app, a screen shot 112 appears showing one or more casinos which have made previous arrangements with, for example IGT, to implement the virtual player card app for the casinos. The patron can scroll through the casinos or customize the app to show only casinos that are of interest to the patron (i.e., where she is a loyalty program member) and select a particular casino. At this stage, the screen shots the patron sees may be similar to the ones shown in 104 through 108. That is, the patron will be asked to enter a player tracking username and player tracking password and proceed from there. The app executing the various functions (e.g., transmitting the username/password, displaying the cards, etc.) may have been developed by IGT, the casino, a third-party app developer, or by a collaborative effort among them. In any case, details of the app execution are transparent to the patron whose goal is to login to the loyalty program of interest and get a PIN number or other data to allow her to begin accumulating points in her loyalty program account without having to carry one or multiple player tracking cards.

Figure 2:
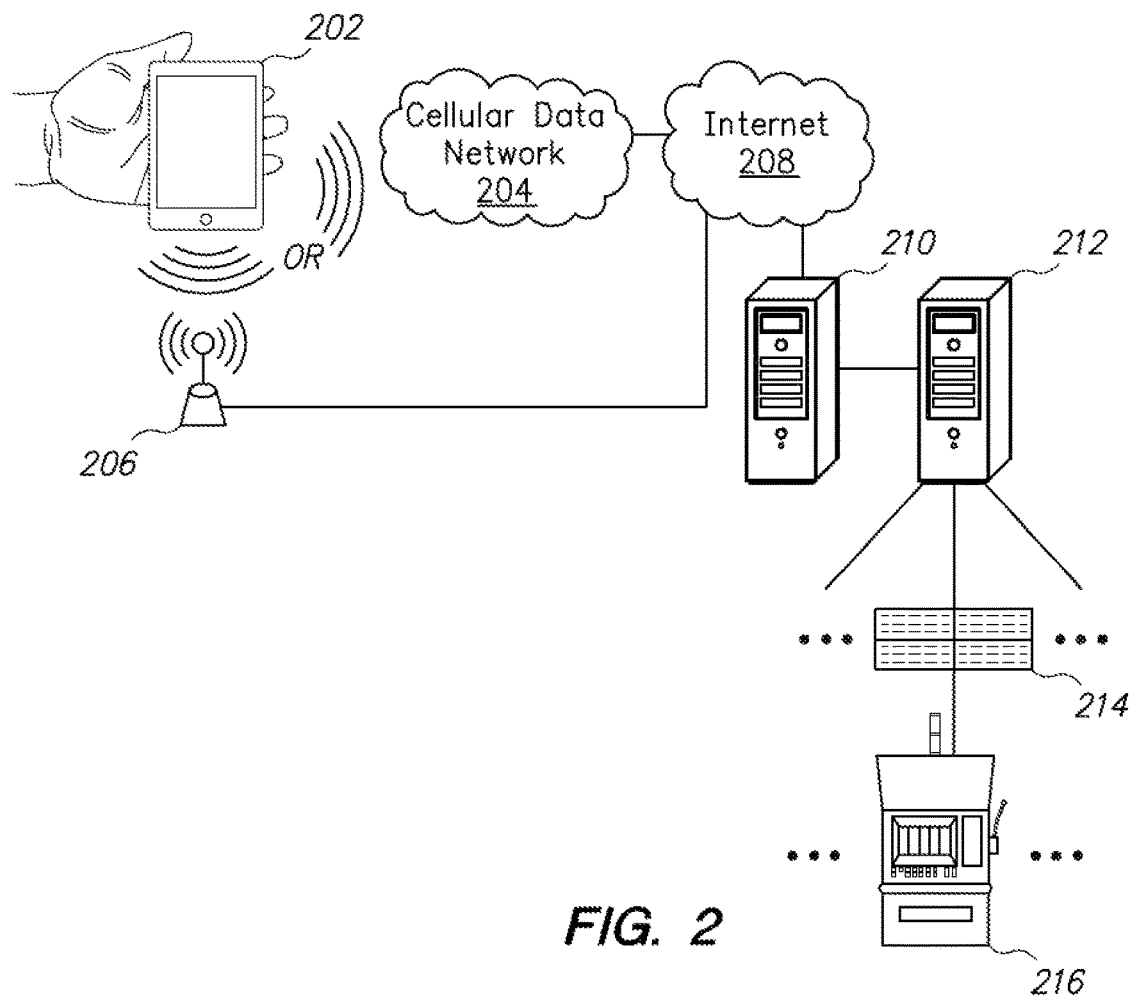
FIG. 2 is network diagram showing an overview of components in a gaming system configured to interact with mobile devices outside the gaming system in accordance with one embodiment.

FIG. 2 is network diagram showing an overview of components in a gaming system configured to interact with mobile devices outside the gaming system in accordance with one embodiment. A mobile device 202, such as a smart phone, tablet computer, or laptop computer, communicates via a wireless or wired connection with an external network. If device 202 is a smart phone (i.e., a mobile phone that can execute mobile applications), it can communicate with a cellular data network 204 operated and maintained by a mobile phone carrier. Device 202 can also connect to a wireless access point 206, such as a Wi-Fi hot spot. This may be more typical if device 202 is a tablet or laptop computer, although smart phones can connect to these points as well.

Cellular data network 204 and wireless access point 206 connect to the Internet 208. A Web server 210 is under control of a casino operator or a gaming provider. It is the interface for the operator or provider to the Internet and, as such, to components outside a gaming system and network. In one embodiment, it implements the Web site for the casino enterprise or the gaming provider. In one embodiment, when a patron activates the virtual player card app described above with respect to FIG. 1, it is accessing the casino's or gaming provider's Web site, the back end of which is Web server 210. Server 210 is connected to a system app server 212. This server handles all requests and operations relating to the casino's apps used by its patrons. In other embodiments, system app server 212 may be directly connected to Internet 208 and may not use Web server 210 as an intermediary. In other embodiments, system app server 212 may handle other functions (e.g., online activity on the casino's Web site) in addition to operations relating only to the casino's apps. In another embodiment, the functions of system app server 212 (i.e., handling the app operations for the casino) may be embedded in Web server 210. Such network topography and system design are under the discretion of the casino gaming system operators and may depend on volume of activity, network traffic, security concerns, and other factors.

System app server 212 is in communication with a player tracking system 214 which may be characterized as being in the "back-end" of the gaming system and generally should have minimal or no direct exposure to components outside the gaming network. System app server 212 may also be in communication with other subsystems or servers in the back-end, such as games. Player tracking system 214 is connected to gaming machine 216 via a gaming network in a manner known to those skilled in the field of gaming systems. Further details on gaming systems and gaming machines are described with respect to FIGS. 6 and 7.

Figure 3:
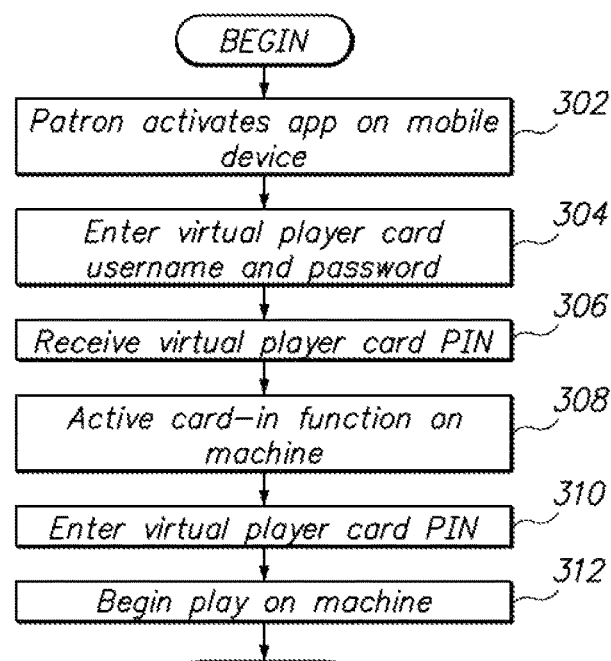
FIG. 3 is a flow diagram of a process of executing a virtual player card app on a mobile device in accordance with the described embodiments.

FIG. 3 is a flow diagram of a process of executing a virtual player card app on a mobile device in accordance with the described embodiments. Prior to the process beginning, the patron has downloaded a virtual player card app on his mobile device and is a registered member of a loyalty program. For illustrative purposes, the description below follows the scenario where the patron downloads a virtual player card app for a specific casino (as shown in screen shots 102 to 108). However, the same process may be used for the game provider virtual card app instance with a few preliminary steps of selecting a specific casino.

At step 302 the patron activates or executes the virtual player tracking card app on his mobile device. By doing this, in one embodiment, the patron is accessing Web server 210 either through a cellular data network or a wireless access point and then via the Internet, as described above. Once the app executes, at step 304 the patron is prompted to enter his virtual player tracking card username and password. This may be done using conventional data input means available on the particular mobile device (e.g., softkeys, voice recognition, etc.). Some mobile device operating systems may allow the patron to have these fields filled in automatically by entering, for example, the first few letters of the username. As described above, this data is entered to enable the patron to "remotely" log into the player tracking system, although the patron can do so from the casino premises, assuming there is adequate cell phone coverage (a requirement regardless of where the patron is if logging in via his smartphone). In one embodiment, the patron-entered data is transmitted to player tracking system 214 via servers 210 and 212. In other embodiments, some player tracking data may be stored in one of the front-end servers, such as Web server 210 where it can only be read but not modified or on system app server 212. This may be desirable, assuming proper security provisions are in place, to make the login response time faster.

The player tracking system (or other systems in the gaming network) checks to ensure that there is a registered loyalty program patron having the same received username and, if so, verifying the password. Recall that the virtual player tracking card username and password were defined by the patron either at time of initial registration or, if already a registered member, at a later time when the patron decides to use the virtual player card service. If the username and password are verified, control goes to step 306 where, in one embodiment, the mobile device receives a virtual player card PIN from the player tracking system and is displayed in a window in the virtual player tracking card app. If the username and/or password are not verified, the patron is denied access and may receive a login failure type message. In another embodiment, the patron can select the virtual player card PIN and have it approved by the system.

In other embodiments, the mobile device receives a bar code, QR code, or other optical machine-readable encoding which is displayed via the app on the mobile device. As described below, this can be used with gaming machines that are capable of scanning the code to uniquely identify the patron, which would serve the same role as a virtual player card PIN which is human readable. In other embodiments, the mobile device does not receive any data in response to a successful login, other than an acknowledgment that the patron is now logged in. The function of uniquely identifying the patron to a particular gaming machine may be done through biometric means if the machine is so equipped and capable.

At step 308, the patron is at a particular gaming machine where he wants to begin player tracked game play. Note that steps 302 to 306 take place on the mobile device and may occur outside the casino environment. When at the gaming machine, the patron activates a card-in function by pressing a card-in softkey in a service window interface on the display of the gaming machine. Additional details on the service window interface and its various functionalities with respect to the present invention are described in FIG. 5 below. Once the card-in function is activated, at step 310, in one embodiment, the patron is prompted to enter the virtual player tracking card PIN that was transmitted to the mobile device at step 306. As noted above, in other embodiments, the patron can have a machine-readable code scanned at this stage. Once the virtual player card PIN is entered and verified by the player tracking system, the patron can begin play on the machine as shown in step 312 and the process is complete. From this point on, the player tracking system will start tracking player game play as if the patron had inserted a physical player tracking card. In one embodiment, if there is a player card bezel on the machine, it may indicate that there is a card in the bezel.

In one embodiment, the PIN is generated by the player tracking system after the patron has been successfully logged in. It is stored in the record or in a suitable manner so it is associated with that specific patron. The length and characteristics of a PIN, such as its length, or whether it is alphanumeric or whether it has to be unique, can be determined by the gaming system designers or player tracking system operators. Further details on PIN verification are described below.

Figure 4:
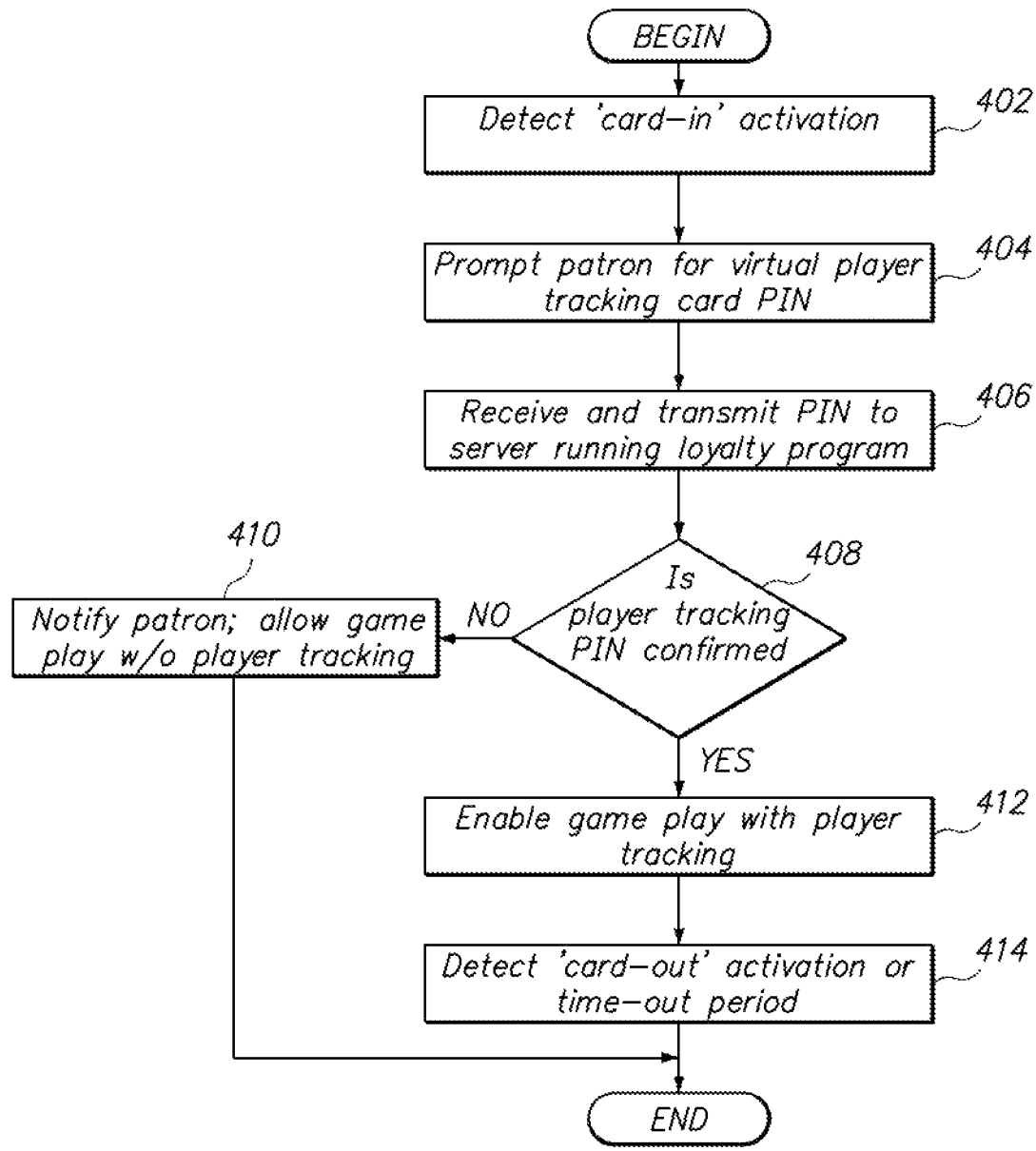
FIG. 4 is a flow diagram of a process of enabling virtual player tracking card functionality on a gaming machine in accordance with the described embodiments.

FIG. 4 is a flow diagram of a process of enabling virtual player tracking card functionality on a gaming machine in accordance with the described embodiments. At step 402 the gaming machine detects a "card-in" activation, presumably by a patron in the casino. This detection is essentially the back-end functionality of step 308. This card-in activation initiates a different set of functions in the machine from the functions that would be initiated from a physical card being inserted or swiped in a card reader or bezel. In one embodiment, the card-in activation initiates essentially the same set of functions in the gaming machine as would occur if a physical player card were swiped or inserted in card reader or bezel. In another embodiment the card-in activation initiates a different set of functions in the machine from the functions that would be initiated if a physical card were inserted. For example, the casino operator may want to have additional functions implemented when a patron uses a player card PIN, maybe to promote use of its player tracking card app. For example, the casino may want the patron to have special privileges that are only allowed for those using the player tracking card app. Special functions can be associated with the temporary player card PIN. For example, the casino can offer a player card PIN bonus where the patron can check her PIN against randomly casino-selected PINs that are in use at periodic intervals. This could be an additional function in the gaming machine that is implemented only when a player card PIN is used. Upon detecting a card-in activation, at step 404 the gaming machine displays content in a service window interface prompting the patron to enter a virtual player tracking card PIN. This and other prompts and content displayed in the service window interface may be implemented by changing the Flash content in the machine, techniques for which are known in the art. Again, as noted above, in other embodiments, there may be other means for identifying the patron which do not require entering a player card PIN. The patron may hold up his mobile device and have an image scanned (which is essentially the same as entering a PIN).

At step 406 the gaming machine receives the PIN or other data and transmits it to a player tracking server in the gaming network. Transmission of data between gaming machines and various components in a gaming network, such as a player tracking server, are known in the art and are described generally below. At step 408 the player tracking system confirms whether the PIN that was entered matches any of the PINs stored in its database. In one embodiment, the PIN is generated by the player tracking system and associated with a player tracking account (e.g., a player tracking account record if the data is stored in a relational database). If the PIN or other data matches data stored in the system, control goes to step 412. If it does not, control goes to step 410 where the patron is notified through a message displayed in the service window interface that his identity could not be verified by the loyalty program or that he should try a different PIN. He may be given the option to continue game play without player tracking.

If the PIN number that was entered matches a PIN in the player tracking database, control goes to step 412 where game play with player tracking is enabled on the machine. Once player tracked game play begins, many of the issues that arise with physical player tracking cards may occur. For example, the original patron with the player tracking account may leave the machine and have a friend continue playing on the machine to accumulate points or he may leave the machine anticipating that another unsuspecting patron may play on the machine and provide the patron with points. However, many of the same restrictions that are in place with physical player tracking cards also apply, such as limits on bonus play and extra credit (which can only occur on one machine). At step 414 the gaming machine detects that there is a card-out activation or that there has been no activity for a certain period of time, in which case the gaming machine or player tracking system automatically times-out the session (automatic expiration).

Figure 5:
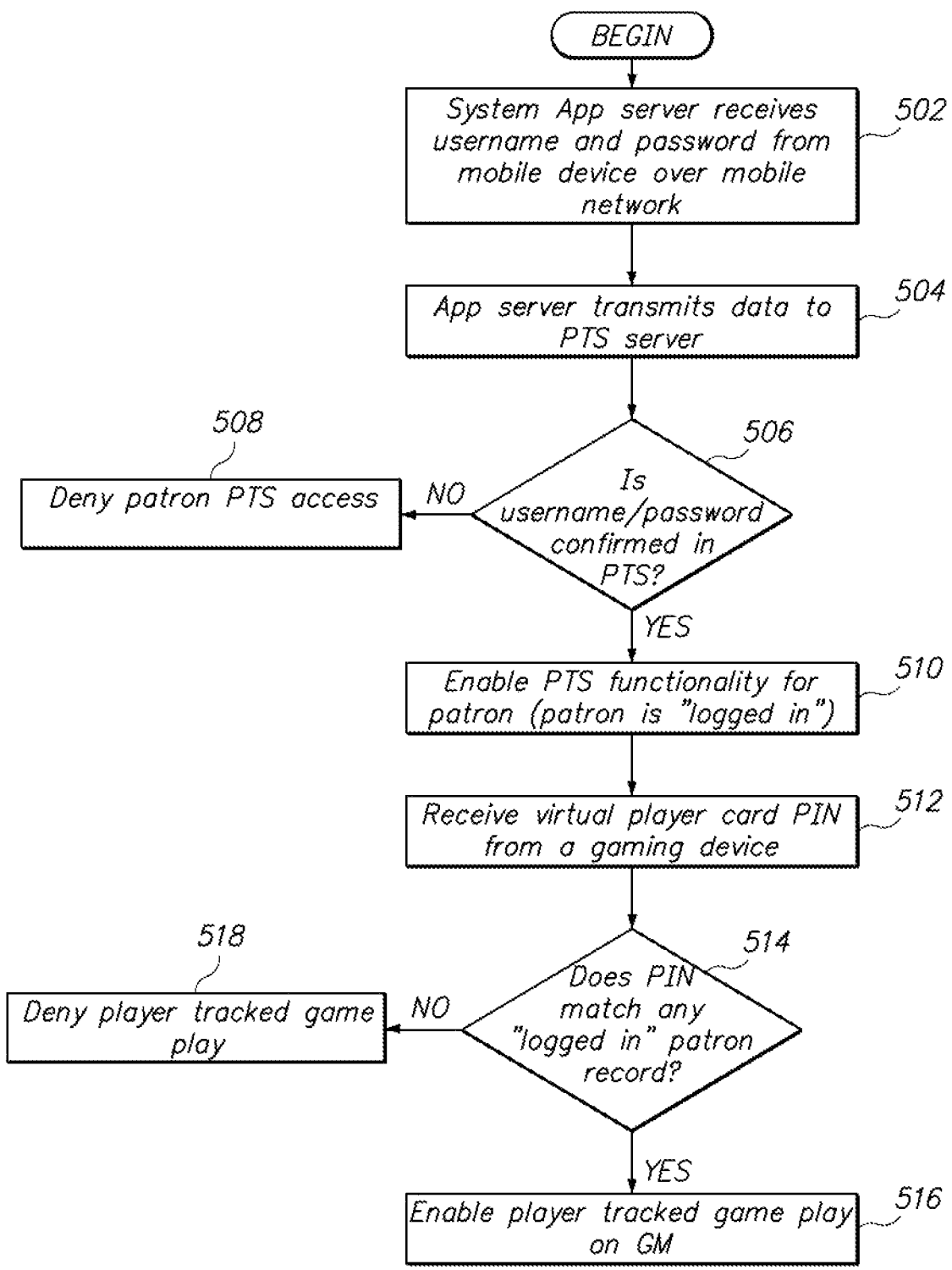
FIG. 5 is a flow diagram of a mobile device-enabled login process occurring on the system app server and player tracking system server in accordance in the described embodiments.

FIG. 5 is a flow diagram of a mobile device-enabled login process occurring on the system app server and player tracking system server in accordance in the described embodiments. At step 502 the system app server receives a user name and password from a Web server which receives the data from the mobile device via one or more wide area networks, such as a cellular data network and the Internet. At step 504 the system app server transmits the data to the player tracking server which operates in the back-end of the gaming network. At step 506, the player tracking server determines whether the user name or password is confirmed or exists in the player tracking database, as described above. If these data are not present in the database, the patron attempting to log in to the player tracking system is denied access and an appropriate message may be sent to the mobile device or the login process simply fails on the mobile device (without the system app server having to send a message downstream to the device).

If the user name and password are confirmed, at step 510 player tracking system functionality is enabled for the patron. That is, the patron is now logged in to the player tracking system. It is worth noting again here that the patron does not have to be at the casino to login to the player tracking system using the mobile device. It can be done from anywhere there is cellular phone access or Internet access.

At step 512 the player tracking server within the gaming system receives via the gaming network a player tracking card PIN (or virtual player card PIN) from the gaming machine. This step does not require the system app server or the mobile device, unless a bar code or QR code is being used to convey data to the gaming machine instead of the patron entering the player tracking card PIN. At step 514 the player tracking server determines whether the PIN matches any patron records which are indicated as logged in. Recall that once the player tracking system logs in a legitimate player tracking patron (step 510), as described in FIG. 4, in one embodiment, the player tracking system generates a player tracking card PIN which is transmitted downstream to the mobile device. In other embodiments, the patron may select this PIN and send it to the player tracking system. The PIN is stored in a field (e.g., a "virtual card PIN" field) in the patron's record in the player tracking system. Thus, when the patron enters the PIN at the gaming machine, it can be used to find a match in the database at step 514. If there is a match, control goes to step 516 where player tracked play is enabled on the specific gaming machine. The patron is said to now be tied to that specific gaming machine or device. If there is no match for the PIN at step 514, the patron is denied player tracked game play on the gaming machine, but may be able to proceed with normal game play on the machine.

In another embodiment, once the casino knows that a particular patron is on the casino property and has logged into the player tracking system, it can begin to market specifically to that patron via his mobile device. Offers, hot machines, and the like can be forwarded to the patron's smart phone. In essence, the patron will have his own personal kiosk by virtue of the mobile device and being logged into the loyalty program. A gaming provider, such as IGT, can develop apps that further enhance this feature (i.e., the virtual player tracking card feature), thereby providing added value to the existing gaming network and gaming system infrastructure.

When a patron is done playing that gaming machine and decides to leave he presses the "Card Out" soft key. This will notify the gaming machine that he has terminated play and cause the system to end that play session. If the patron leaves the gaming machine without initiating a card out, the system will monitor idle time at the gaming machine and automatically log the patron out after a pre-determined amount of time. This will prevent a patron from logging into multiple machines simultaneously for the purpose of trying to accrue play on their account for which they did not earn themselves. Also, an automatic card out will be done if a physical card is inserted in the card reader while there is "virtual" card in active.

Figure 6:
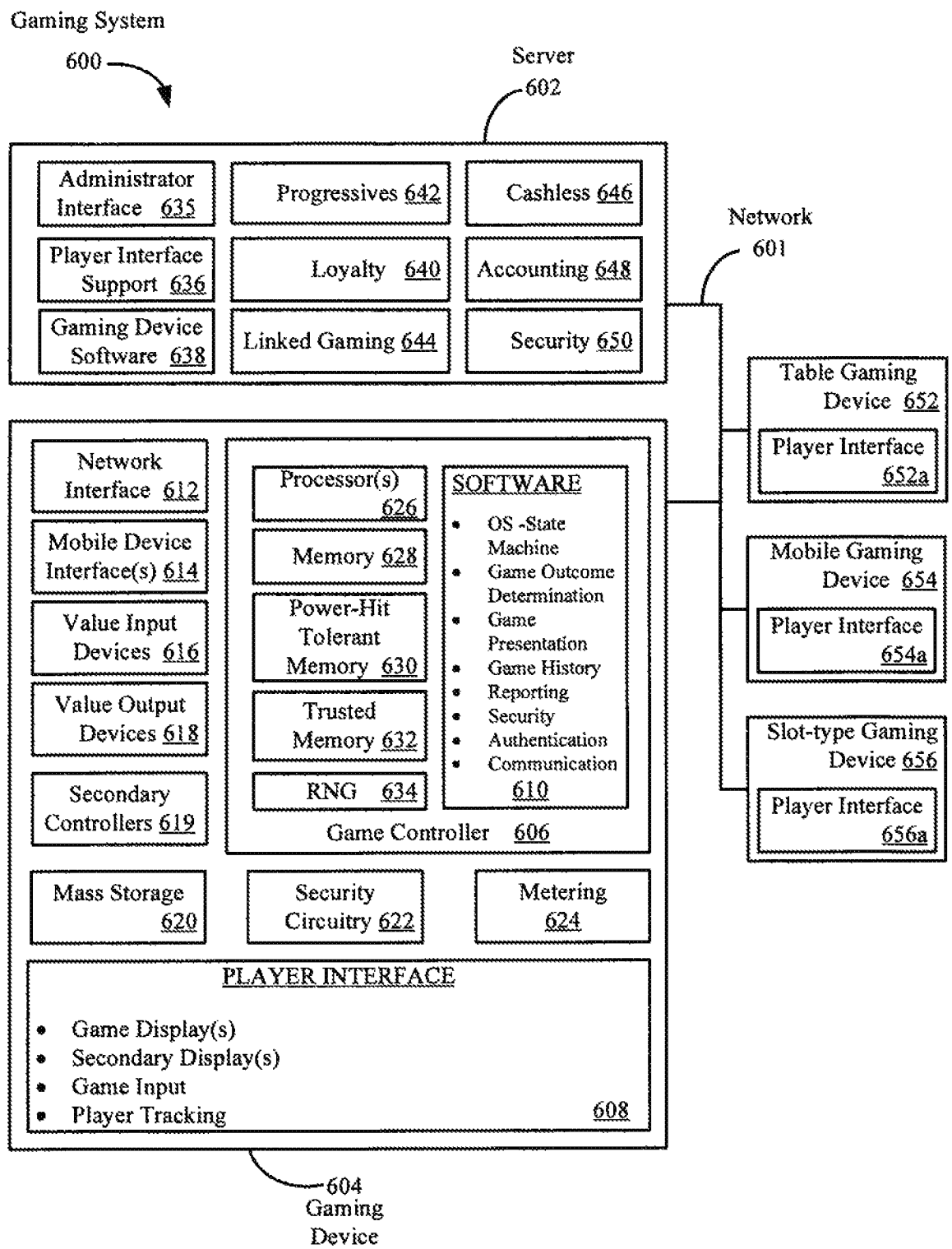
FIG. 6 shows a block diagram of a gaming system including a server and gaming devices in accordance with the described embodiments.

FIG. 6 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game)

from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interlace 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Figure 7:
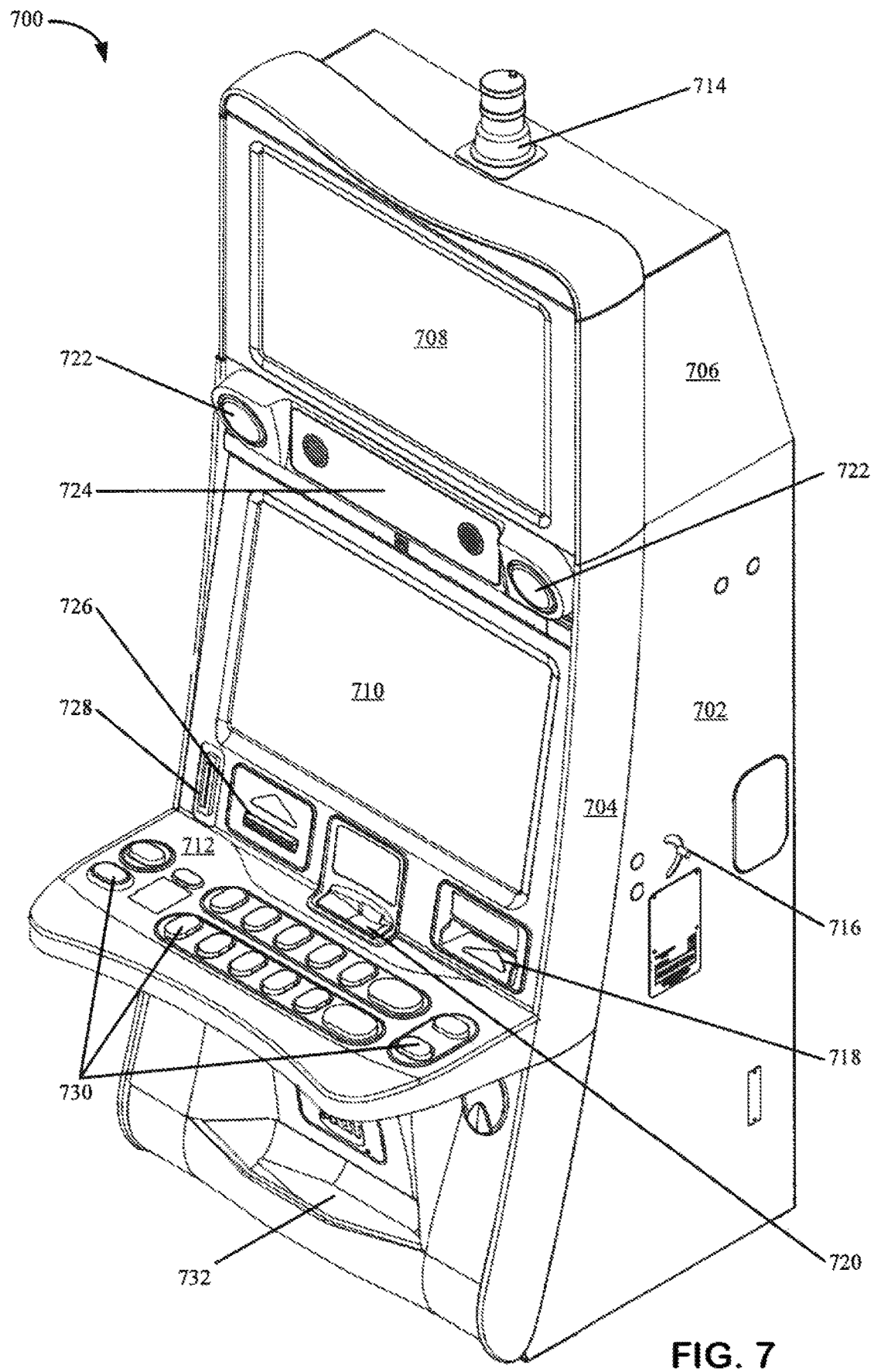
FIG. 7 shows a perspective drawing of a gaming device in accordance with the described embodiments.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 7.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 7.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604.

For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 7 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 6, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 7, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 7 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention claimed is:

1. An electronic gaming machine comprising:
   a display device;
   a player accessible input device;
   a processor; and
   a memory device which stores a plurality of instructions, which when executed by the processor, cause the processor to:
   after a mobile device receives first data associated with a virtual player tracking card accessible via a mobile device application of the mobile device and then responsive to receiving, via the player accessible input device, second, different data associated with a player initiated verification of the virtual player tracking card, cause a bezel of a player tracking unit to indicate receipt of a physical player tracking card when no physical player tracking card is inserted in a card reader associated with the player tracking unit, wherein the second, different data associated with the player initiated verification of the virtual player tracking card is received separate from wirelessly receiving, via a network, any data from the mobile device and is associated with a virtual player tracking card personal identification number determined, independent of the electronic gaming machine, prior to the mobile device receiving first data associated with the virtual player tracking card, and thereafter, for a wagered on play of a game tracked in association with the virtual player tracking card:
determine a game outcome,
cause the display device to display the determined game outcome,
determine any award associated with the determined game outcome, and
cause the display device to display any determined award.

2. The electronic gaming machine of claim 1, wherein the second data is received in association with a service window displayed by the display device.

3. The electronic gaming machine of claim 1, wherein when executed by the processor, responsive to a determination of a card out event, the plurality of instructions cause the processor to cause the bezel of the player tracking unit to cease indicating receipt of any physical player tracking card.

4. The electronic gaming machine of claim 1, wherein the first data comprises at least one of: a virtual player tracking card identifier and a virtual player tracking card password.

5. The electronic gaming machine of claim 1, wherein the second data is received in association with an optical machine readable code displayed by a display device of the mobile device.

6. The electronic gaming machine of claim 1, which comprises an acceptor, wherein when executed by the processor, the plurality of instructions cause the processor to, responsive to a physical item being received via the acceptor, establish a credit balance based, at least in part, on a monetary value associated with the received physical item.

7. A gaming system comprising:
a processor; and
a memory device which stores a plurality of instructions, which when executed by the processor, cause the processor to:
after a mobile device receives first data associated with a virtual player tracking card accessible via a mobile device application of the mobile device and then responsive to receiving, via a player accessible input device, second, different data associated with a player initiated verification of the virtual player tracking card, cause a bezel of a player tracking unit to indicate receipt of a physical player tracking card when no physical player tracking card is inserted in a card reader associated with the player tracking unit, wherein the second, different data associated with the player initiated verification of the virtual player tracking card is received separate from wirelessly receiving, via a network, any data from the mobile device and is associated with a virtual player tracking card personal identification number determined, independent of the gaming system, prior to the mobile device receiving first data associated with the virtual player tracking card, and
thereafter, for a wagered on play of a game tracked in association with the virtual player tracking card:
determine a game outcome,
cause a display, via a display device, of the determined game outcome,
determine any award associated with the determined game outcome, and
cause a display, via the display device, of any determined award.

8. The gaming system of claim 7, wherein the second data is received in association with a service window displayed by the display device.

9. The gaming system of claim 7, wherein when executed by the processor, responsive to a determination of a card out event, the plurality of instructions cause the processor to cause the bezel of the player tracking unit to cease indicating receipt of any physical player tracking card.

10. The gaming system of claim 7, wherein the first data comprises at least one of: a virtual player tracking card identifier and a virtual player tracking card password.

11. The gaming system of claim 7, wherein the second data is received in association with an optical machine readable code displayed by a display device of the mobile device.

12. The gaming system of claim 7, wherein a credit balance is increasable based on any determined award, said credit balance being increasable via an acceptor of a physical item associated with a monetary value, and said credit balance being decreasable responsive to a cashout input.

13. A method of operating a gaming system, said method comprising:
after a mobile device receives first data associated with a virtual player tracking card accessible via a mobile device application of the mobile device and then responsive to receiving, via a player accessible input device, second, different data associated with a player initiated verification of the virtual player tracking card, causing a bezel of a player tracking unit to indicate a first receipt of a physical player tracking card when no physical player tracking card is inserted in a card reader associated with the player tracking unit, wherein the second, different data associated with the player initiated verification of the virtual player tracking card is received separate from wirelessly receiving, via a network, any data from the mobile device and is associated with a virtual player tracking card personal identification number determined, independent of the gaming system, prior to the mobile device receiving first data associated with the virtual player tracking card, and
thereafter, for a wagered on play of a game tracked in association with the virtual player tracking card:
determining, by a processor, a game outcome,
causing a display, via a display device, of the determined game outcome,
determining, by the processor, any award associated with the determined game outcome, and
causing a display, via the display device, of any determined award.

14. The method of claim 13, further comprising, responsive to a determination of a card out event, causing the bezel of the player tracking unit to cease indicating receipt of any physical player tracking card.

15. The method of claim 14, further comprising causing the bezel of the player tracking unit to indicate a second receipt of a physical player tracking card when the physical player tracking is inserted into the card reader associated with the player tracking unit, wherein the indication of the first receipt is distinct from the indication of the second receipt.

* * * * *